US011977650B2

(12) United States Patent
Gallagher

(10) Patent No.: US 11,977,650 B2
(45) Date of Patent: *May 7, 2024

(54) SYSTEMS AND METHODS FOR EFFICIENT ACCESS CONTROL

(71) Applicant: Unisys Corporation, Blue Bell, PA (US)

(72) Inventor: Adam Gallagher, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,680

(22) Filed: Jul. 11, 2022

(65) Prior Publication Data

US 2022/0366065 A1 Nov. 17, 2022

Related U.S. Application Data

(63) Continuation of application No. 15/187,950, filed on Jun. 21, 2016, now Pat. No. 11,386,213.

(51) Int. Cl.
*G06F 21/62* (2013.01)
*G06F 9/455* (2018.01)

(52) U.S. Cl.
CPC ...... *G06F 21/6209* (2013.01); *G06F 9/45545* (2013.01)

(58) Field of Classification Search
CPC .................. G06F 21/6209; G06F 9/45545
See application file for complete search history.

(56) References Cited

U.S. PATENT DOCUMENTS

| 5,991,751 | A | * | 11/1999 | Rivette | ................. | G06F 16/382 |
| | | | | | | 707/E17.093 |
| 6,439,783 | B1 | | 8/2002 | Antoshenkov | | |
| 8,843,997 | B1 | * | 9/2014 | Hare | ................... | H04L 63/0815 |
| | | | | | | 709/200 |
| 2008/0016098 | A1 | | 1/2008 | Frieden et al. | | |
| 2008/0301124 | A1 | | 12/2008 | Alves et al. | | |
| 2012/0079464 | A1 | | 3/2012 | Smet et al. | | |
| 2012/0137367 | A1 | * | 5/2012 | Dupont | ................... | G06F 21/00 |
| | | | | | | 726/25 |

(Continued)

OTHER PUBLICATIONS

U.S. Patent and Trademark Office, "Final Office Action", U.S. Appl. No. 15/187,950, dated Nov. 5, 2019, 14 pgs.

(Continued)

*Primary Examiner* — Kris E Mackes
*Assistant Examiner* — Lin Lin M Htay
(74) *Attorney, Agent, or Firm* — Shook, Hardy & Bacon L.L.P.

(57) ABSTRACT

An apparatus configured for database access control. The apparatus includes a memory and a processor coupled to the memory, wherein the processor is configured to execute instructions, The instructions include receiving a statement requesting access for a user to data files stored in a non-transitory memory medium; parsing the statement into one or more arguments, wherein each argument ends with a logical operator; computing a skip count for each of the arguments; evaluating the statement using the skip counts to determine whether the access should be granted to the user; retrieving the data files from the non-transitory memory medium; and sending the data files to the user, if the access is granted.

20 Claims, 5 Drawing Sheets

(56) References Cited

U.S. PATENT DOCUMENTS

| | | | |
|---|---|---|---|
| 2014/0189889 A1* | 7/2014 | Winters | G06F 21/62 |
| | | | 726/30 |
| 2015/0081706 A1 | 3/2015 | Wulcan et al. | |
| 2015/0310225 A1 | 10/2015 | Heise et al. | |
| 2016/0277368 A1 | 9/2016 | Narayanaswamy et al. | |
| 2016/0335281 A1* | 11/2016 | Teodorescu | G06F 16/113 |

OTHER PUBLICATIONS

U.S. Patent and Trademark Office, "Final Office Action", U.S. Appl. No. 15/187,950, dated Sep. 28, 2020, 14 pgs.
U.S. Patent and Trademark Office, "Non-Final Office Action", U.S. Appl. No. 15/187,950, dated Apr. 23, 2018, 18 pgs.
U.S. Patent and Trademark Office, "Non-Final Office Action", U.S. Appl. No. 15/187,950, dated Jul. 16, 2021, 16 pgs.
U.S. Patent and Trademark Office, "Non-Final Office Action", U.S. Appl. No. 15/187,950, dated Mar. 18, 2020, 14 pgs.
U.S. Patent and Trademark Office, "Notice of Allowance and Fee(s) Due", U.S. Appl. No. 15/187,950, dated Apr. 5, 2022, 110 pgs.
U.S. Patent and Trademark Office, "Notice of Allowance and Fee(s) Due", U.S. Appl. No. 15/187,950, dated Mar. 16, 2022, 10 pgs.

* cited by examiner

200

205 Receiving, at a processor, a statement requesting access for a user to data files stored in a non-transitory memory medium 210 parsing, by the processor, the statement into one or more arguments 215 computing, by the processor, a skip count for each of the arguments 220 evaluating, by the processor, the statement using the skip count to determine whether the access should be granted to the user 225 retrieving, by the processor, the data files from the non-transitory memory medium 230 sending, by the processor, the data files to the user, if the access is granted

FIG. 2

SYSTEMS AND METHODS FOR EFFICIENT ACCESS CONTROL

CROSS REFERENCE TO RELATED APPLICATIONS

This application is a continuation of U.S. application Ser. No. 15/187,950, filed Jun. 21, 2016, now U.S. Pat. No. 11,386,213 issued on Jul. 12, 2022, the contents of which are hereby incorporated by reference herein.

FIELD OF THE DISCLOSURE

The instant disclosure relates generally to database management. More specifically, this disclosure relates to embodiments of apparatuses, systems, and methods that accelerates access control decision making.

BACKGROUND

Access control is important to database management. Rules for regulating access to a data file or object can be convoluted. In some situations, access control itself may consume significant computing power, resulting in lower performing database services. Embodiments and their equivalents disclosed herein provide solutions to increase database efficiency by efficiently manage access control.

SUMMARY

The instant disclosure relates generally to database management. More specifically, this disclosure relates to embodiments of apparatuses, systems, and methods that accelerates access control decision making. According to one embodiment, a method includes steps of: receiving, at a processor, a statement requesting access for a user to data files stored in a non-transitory memory medium; parsing, by the processor, the statement into one or more arguments, wherein each argument ends with a logical operator; computing, by the processor, a skip count for each of the arguments; evaluating, by the processor, the statement using the skip counts to determine whether the access should be granted to the user; retrieving, by the processor, the data files from the non-transitory memory medium; and sending, by the processor, the data files to the user, if the access is granted.

According to one embodiment, a computer program product includes a non-transitory computer-readable medium comprising instructions which, when executed by a processor of a computing system, cause the processor to perform steps. The steps include receiving a statement requesting access for a user to data files stored in a non-transitory memory medium; parsing the statement into one or more arguments, wherein each argument ends with a logical operator; computing a skip count for each of the arguments; evaluating the statement using the skip counts to determine whether the access should be granted to the user; retrieving the data files from the non-transitory memory medium; and sending the data files to the user, if the access is granted.

According to one embodiment, an apparatus includes a memory and a processor coupled to the memory, wherein the processor is configured to execute steps. The steps include receiving a statement requesting access for a. user to data. files stored in a non-transitory memory medium; parsing the statement into one or more arguments, wherein each argument ends with a logical operator; computing a skip count for each of the arguments; evaluating the statement using the skip counts to determine whether the access should he granted to the user; retrieving the data files from the non-transitory memory medium; and sending the data files to the user, if the access is granted.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims, The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

FIG. 2 is a method that grants access to data files.

DETAILED DESCRIPTION

Figure 1:
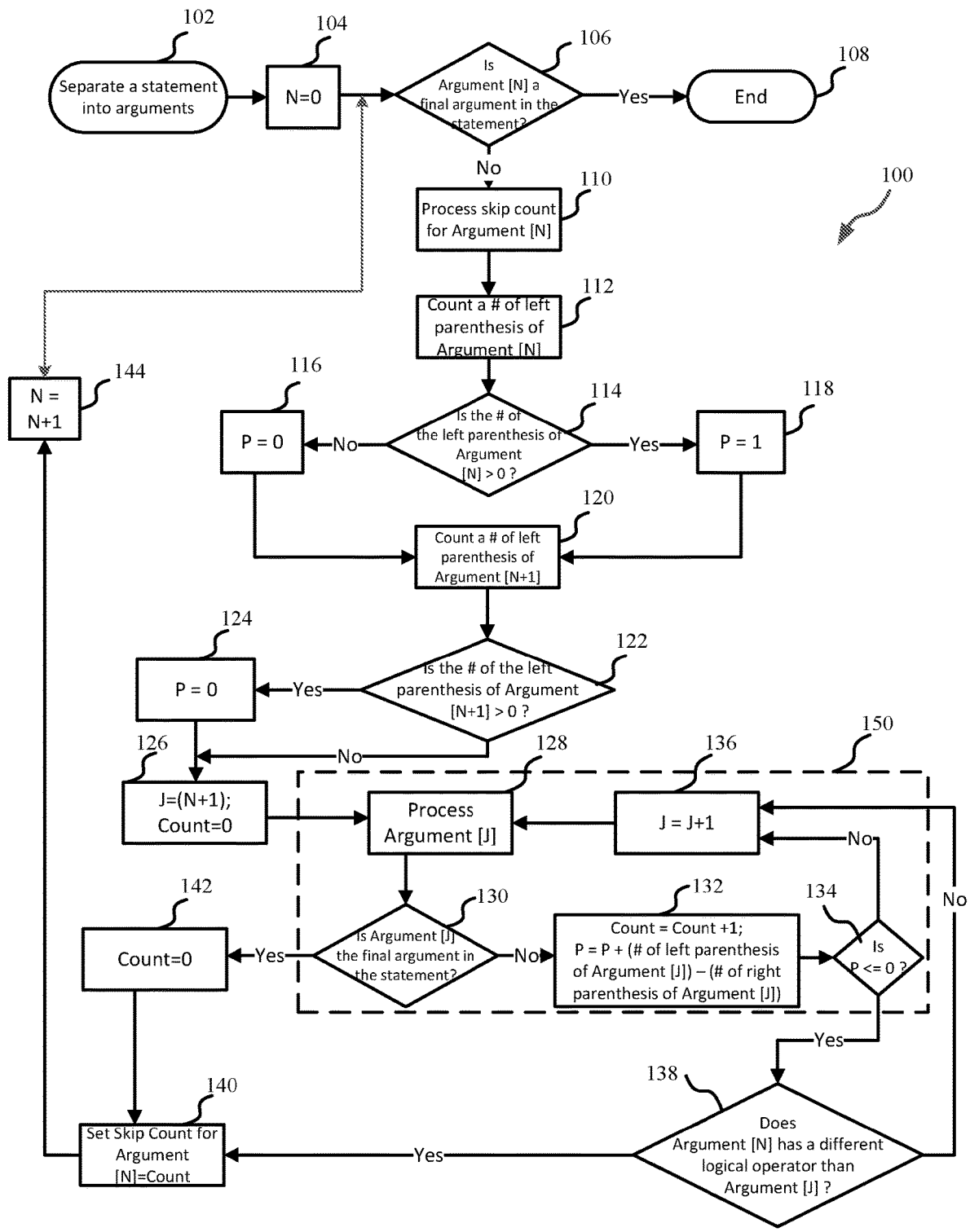
FIG. 1 is a method that computes skip counts according to one embodiment.

A user may request to access a data file by sending the access control unit a statement. The statement may include a plurality of user identities connected with logical operators and grouped in multiple levels of parentheses. For example, a statement may be: (GROUP EQ 1 OR (GROUP EQ 2 AND ((GROUP EQ 3 OR GROUP EQ 4) OR (GROUP EQ 5 AND GROUP EQ 6))) OR GROUP EQ 7).

When a statement includes a plurality of logical connectors, e.g., AND and OR, it is not necessary to processes every identified users in the statement. Put in another way, when processing a statement, some portions of the statement can be skipped to realize a faster processing of access control.

For example, in one embodiment, a statement includes (GROUP 1 AND GROUP 2). When processing this statement, if GROUP 1 is determined to be false, it is not necessary for the access control unit to process GROUP 2 anymore. This is because regardless whether GROUP 2 is true or false the whole statement is already false.

For another example, in one embodiment, a statement includes (GROUP 1 OR GROUP 2). When processing this statement, if GROUP 1 is determined to be true, it is not necessary for the access control unit to process GROUP 2 anymore. This is because regardless whether GROUP 2 is true or false the whole statement is already true.

In both of the examples above, the access control unit may skip the processing for GROUP 2. Such skipping methodologies significantly increase the efficiencies of access control. Embodiments disclosed herein relates to increasing the efficiencies of access control by utilizing skip counts.

The term "statement" means an expression that includes one or more user identities. if a statement includes more than one users, the users are connected with at least one logical operator and grouped with at least a pair of parentheses. For example, a statement may be: (GROUP EQ 1 OR (GROUP EQ 2 AND ((GROUP EQ 3 OR GROUP EQ 4) OR (GROUP EQ 5 AND GROUP EQ 6))) OR GROUP EQ 7), wherein "GROUP EQ 1-7" are user identities, "AND" and "OR" are logical operators, and "( )" is a pair of parentheses.

The term "argument" means a portion of a "statement." Different methods can be applied to parse one statement into one or more arguments.

The term "access control unit" means a piece of software and/or hardware that processes access control of data files stored in databases. An access control unit may be a stand-alone software and/or hardware. An access control unit may also be an integrated part of another software and/or hardware.

The term "instruction" means a processor-executable instruction, for example, an instruction written as programming codes. An instruction may be executed by any suitable processor, for example, x86 processor. An instruction may be programmed in any suitable computer language, for example, machine codes, assembly language codes, C language codes, C++ language codes, Fortran codes, Java codes, Matlab codes, or the like. All methods, software and emulated hardware disclosed in this disclosure can be implemented as instructions.

In this disclosure, variables N, J, and P are integers, e.g., −1, 0, 1, 2, etc. In this disclosure, variables Count and Skip Count are zero or positive integers, e.g., 0, 1, 2 etc. In one embodiment, when variable Skip Count is zero, it means skip all the remaining arguments.

FIG. 1 is a method 100 that computes skip counts according to one embodiment. Method 100 can be included in the method 200 in FIG. 2. In one embodiment, method 100 can be included in block 215. Method 100 can be implemented in the computer system 300 in FIG. 3. In one embodiment, method 100 are coded as instructions that can be stored in the data storage 306 and implemented by the relevant hardware 304-310. Method 100 can be implemented in the computer system 400 in FIG. 4. In one embodiment, method 100 are coded as instructions that are executed by the CPU 402. Method 100 may be implemented on the server 500 in FIG. 5A.

The method 100 starts at block 102. At block 102, the method 100 separates a statement into arguments. In one embodiment, the method 100 separates the statement according to the logical operators, e.g., AND, OR, etc. In one embodiment, the method 100 separates the statement by ignoring the left and/or right parenthesis. The method 100 proceeds to block 104, which sets N to 0.

At block 104, the method 100 sets N to zero regardless of its previous value. In one embodiment, this block 104 is an initialization of the N value. The method proceeds to block 106.

At 106, the method 100 determines whether Argument [N] is a final argument in the statement. At 106, if Argument [N] is a final argument of the statement, the method 100 proceeds to block 108, which ends the method 100. At 106, if the Argument [N] is not the final argument in the statement, the method 100 proceeds to block 110, which processes the skip count for Argument [N].

At block 110, the method 100 includes processing skip count for Argument [N]. The method 100 proceeds to block 112.

At block 112, the method 100 counts a number (the word "number" is represented as "#" in FIG. 1) of left parenthesis of Argument [N]. The method 100 proceeds to block 114, which determines whether the number of the left parenthesis of Argument [N] is greater than zero.

At block 114, the method determines whether the number of the left parenthesis of Argument [N] calculated in 112 is greater than zero. If the number is greater than zero, the method 100 proceeds to 118, which sets P value as one. If the number is not greater than zero, the method 100 proceeds to 116, which sets P value as zero.

At block 116, the method 100 sets the P value as zero, regardless of P's previous values. The method 100 proceeds to block 120, which counts a number of left parenthesis of Argument [N+1].

At block 118, the method 100 sets the P value as one, regardless of P's previous values. The method 100 proceeds to block 120, which counts a number of left parenthesis of Argument [N+1].

The method 100 proceeds to block 120, which counts a number of left parenthesis of Argument [N+1]. The method 100 proceeds to block 122.

At 122, the method 100 determines whether the number of the left parenthesis of Argument [N+1] is greater than zero. If the number of the left parenthesis of Argument [N+1] is greater than zero, the method proceeds to block 124. If the number of the left parenthesis of Argument [N+1] is not greater than zero, the method proceeds to block 126.

At block 124, P is set to zero, regardless of its previous values. The method proceeds to block 126, which sets J equal to N+1.

At block 126, J is set to N+1. For example, if N=0, then J=1. For another example, if N=1, then J=2. At block 126, the method 100 sets Count to be zero, regardless of its previous values. After block 126, the method 100 proceeds into a loop 150. As shown in FIG. 1, after block 126, the method 100 proceeds to block 128 of the loop 150.

Loop 150 is a sub-method in the method 100 to calculate variables Count and P. In one embodiment, loop 150 may be a separate method that can be incorporated into the method 100. In one embodiment, if method 100 is written as a function (e.g., a function of C language), loop 150 may be a separate function or a sub-function that can be called by method 100.

As shown in FIG. 1, loop 150 includes blocks 128, 130, 132, 134, and 136. The method 100 has two entry points to enter into the loop 150. One entry point is from block 126 to block 128. Another entry point is from block 138 to block 136.

As shown in FIG. 1, the method 100 has two exit points to exit the loop 150. One exit point is from block 130 to block 142. Another exit point is from block 134 to block 138.

At 128, the method 100 processes Argument [J]. The method 100 proceeds to 130, which determines whether Argument [J] is the final argument in the statement.

At 130, the method determines whether Argument [J] is the final argument in the statement. If the Argument [J] is the final argument in the statement, the method 100 exits the loop 150 from 130 to 142. If the Argument [J] is not the final argument in the statement, the method 100 proceeds to 132, which calculates variables Count and P.

At 132, the method 100 set Count equal to Count+1. Put in another way, Count is increased by 1. At 132, the method 100 sets P equal to P+(number of left parenthesis of Argument [J]−(number of right parenthesis of Argument [J]). The method 100 further proceeds to block 134, which determines whether P is equal or less than zero.

At 134, the method 100 determines whether P is equal or less than zero. If P is equal or less than zero, the method 100 exits loop 150 from 134 to 138, which determines whether Argument [N] has a different logical operator than Argument [J]. If P is not equal or less than zero, the method 100 proceeds to block 136, which sets J equal to J+1.

At 136, the method 100 sets J equal to J+1. Put in another way, the method 100 increases J by one. For example, if J is 1 before block 136, then J becomes 2 at block 136. The method 100 proceeds to block 128, which processes Argument [J].

One round of the loop 150 is completed if the method 100 goes through blocks 128, 130, 132, 134, and 136. In each round, J is increased by 1, and Count is increased by 1. In each round, P is increased by the number of left parenthesis of Argument [J] and decreased by the number of right parenthesis of Argument [J]. The method 100 eventually will exit the loop 150 either because Argument [J] is the final argument of the statement at block 130, or P is equal or less than zero at block 134.

At 142, the method 100 sets Count equal to zero, regardless of its previous value. The method proceeds to 140, which sets Skip Count for Argument [N]=Count, At 138, the method 100 determines whether Argument [N] has a different logical operator than Argument [J]. If Argument [N] and Argument [J] have different logical operators, then the method 100 proceeds to block 140, which sets Skip Count for Argument [N]=Count. If Argument [N] and Argument [J] have a same logical operator, then the method 100 proceeds to block 136, entering back into the loop 150.

At 140, the method 100 sets Skip Count for Argument [N]=Count. The method 100 proceeds to block 144, which sets N=N+1.

At 144, the method 100 sets N=N+1. Put in another way, at 144, the method increases N by 1. The method 100 proceeds to block 106, which determines whether Argument [N] is a final argument in the statement.

For clarity purposes, an embodiment is given to illustrate method 100. In this embodiment, the statement is: (GROUP EQ 1 OR (GROUP EQ 2 AND ((GROUP EQ 3 OR GROUP EQ 4) OR (GROUP EQ 5 AND GROUP EQ 6))) OR GROUP EQ 7), At block 102, the statement (GROUP EQ 1 OR (GROUP EQ 2 AND ((GROUP EQ 3 OR GROUP EQ 4) OR (GROUP EQ 5 AND GROUP EQ 6))) OR GROUP EQ 7) can be divided into seven different arguments. The arguments are listed in Table 1.

As shown in Table 1, each argument ends with an logical operator. The parenthesis of the arguments are ignored during the process of dividing the statement into arguments.

After block 102, the method 100 starts with N=0 at 104. Thus, Argument [N=0]: (GROUP EQ 1 OR is being processed. In the case of N=0, the method 100 goes through the blocks of 106, 110, 112, 114, 118, 120, 122, 124, and 126, before entering the loop 150. Before entering the loop 150, P equals zero. After entering the loop 150, the method 100 goes through the loop 150 five rounds, wherein J goes from 1 to 6. The details of the calculations of the variables J, Count, and P are shown in Table 2. Eventually, the method 100 exists the loop 150 with J=6 and Count=0. Thus, the Skip Count for Argument [N=0] is zero.

N is further increased by one at block 144. N is now one. Thus, Argument [N=1]: (GROUP EQ 2 AND is being processed. In the case of N=1, the method 100 goes through the blocks of 106, 110, 112, 114, 118, 120, 122, 124, and 126, before entering the loop 150. Before entering the loop 150, P equals zero. After entering the loop 150, the method 100 goes through the loop 150 three rounds, wherein J goes from 2 to 5. The details of the calculations of the variables J, Count, and P are shown in Table 3. Eventually, the method 100 exists the loop 150 with J=5 and Count=4. Thus, the Skip Count for Argument [N=1] is four.

N is further increased by one at 144 and now equals two. Thus, Argument [N=2]: ((GROUP EQ 3 OR is being processed. In the case of N=2, the method 100 goes through the blocks of 106, 110, 112, 114, 118, 120, 122, and 126, before entering the loop 150. Before entering the loop 150, P equals one. After entering the loop 150, the method 100 goes through the loop 150 three rounds, wherein J goes from 3 to 6. The details of the calculations of the variables J, Count, and P are shown in Table 4. Eventually, the method 100 exists the loop 150 with J=6 and Count=0. Thus, the Skip Count for Argument=21 is zero.

N is further increased by one at 144 and now equals three. Thus, Argument [N=3]: GROUP EQ 4) OR is being processed. In the case of N=3, the method 100 goes through the blocks of 106, 110, 112, 114, 116, 120, 122, 124, and 126, before entering the loop 150. Before entering the loop 150, P equals zero. After entering the loop 150, the method 100 goes through the loop 150 two rounds, wherein J goes from 4 to 6. The details of the calculations of the variables J Count, and P are shown in Table 5. Eventually, the method 100 exists the loop 150 with J=6 and Count=0. Thus, the Skip Count for Argument [N=3] is zero.

N is further increased by one at 144 and now equals four. Thus, Argument [N=4]: (GROUP EQ 5 AND is being processed. In the case of N=4, the method 100 goes through the blocks of 106, 110, 112, 114, 118, 120, 122, and 126, before entering the loop 150. Before entering the loop 150, P equals one. After entering the loop 150, the method 100 does not finish one round of the loop 150. The method 100 enters the loop 150 with J=5, and exits the loop 150 with J=5. The details of the calculations of the variables J, Count, and P are shown in Table 6. Eventually, the method 100 exists the loop 150 with J=5 and Count=1. Thus, the Skip Count for Argument [N=4] is one.

N is further increased by one at 144 and now equals five. Thus, Argument [N=5]: GROUP EQ 6))) OR is being processed. In the case of N=5, the method 100 goes through the blocks of 106. 110, 112, 114, 116, 120, 122, and 126, before entering the loop 150. Before entering the loop 150, P equals zero. After entering the loop 150, the method 100 does not finish one round of the loop 150. The method 100 enters the loop 150 with J=6, and exits the loop 150 with J=6. The details of the calculations of the variables J, Count, and P are shown in Table 7. Eventually, the method 100 exists the loop 150 with J=6 and Count=0. Thus, the Skip Count for Argument [N=5] is zero.

N is further increased by one at 144 and now equals six. Thus, Argument [N=6]: GROUP EQ7) is being processed. Because Argument [N=6]: GROUP EQ7) is the last argument in the statement, the method 100 proceeds from 106 to 108 and terminates.

FIG. 2 is a method 200 that grants access to data files. Method 200 may include method 100. In one embodiment, blocks 205, 210, and 215 may include method 100. Method 200 can be implemented in the computer system 300 in FIG. 3. In one embodiment, method 200 are coded as instructions that can be stored in the data storage 306 and implemented by the relevant hardware 304-310. Method 200 can be implemented in the computer system 400 in FIG. 4. In one embodiment, method 200 are coded as instructions that are executed by the CPU 402. Method 200 may be implemented on the server 500 in FIG. 5A.

The method 200 starts at 205, which receives a statement requesting access for a user to data files stored in a non-transitory memory medium. In one embodiment, the statement includes one or more users. In one embodiment, the statement includes logical operators, e.g., AND, OR, etc. In one embodiment, the statement includes parenthesis.

At 210, the method 200 parses the statement into one or more arguments. In one embodiment, the parsing of the statement ignores the parenthesis. In one embodiment, each argument ends with a logical operator, except the last argument in the statement. In one embodiment, there is no logical operator at the end of the statement. In one embodiment, the last argument in the statement ends with a right parenthesis.

At 215, the method 200 computes a skip count for each of the arguments. In one embodiment, a skip count is either zero or positive integers, i.e., 0, 1, 2, 3. In one embodiment, a skip count of "0" may mean skip evaluating all the remaining arguments. In one embodiment, a skip count of "1" may mean skip the following one argument. In one embodiment, a skip count of "2" may mean skip the following two arguments, so on and so forth.

At 220, the method 200 evaluates the statement using the skip counts to determine whether the access should be granted to one of the user. Evaluation using skip counts increases the speed and efficiency of the process of evaluation.

At 225, the method 200 retrieves the data files from the non-transitory memory medium. In one embodiment, the non-transitory memory medium can be the data storage 306 in FIG. 3, the ROM 406, the RAM 408, and/or the data storage 412 in FIG. 4. In one embodiment, the data files may be stored in a dedicated partition of the non-transitory memory medium.

At 230, the method 200 sends the data files to the user, if the access is granted. In one embodiment, the data files may be sent through input/output ports, e.g. communication adapter 414 in FIG. 4 and/or communication adapter 514 in FIGS. 5A and 5B.

Figure 3:
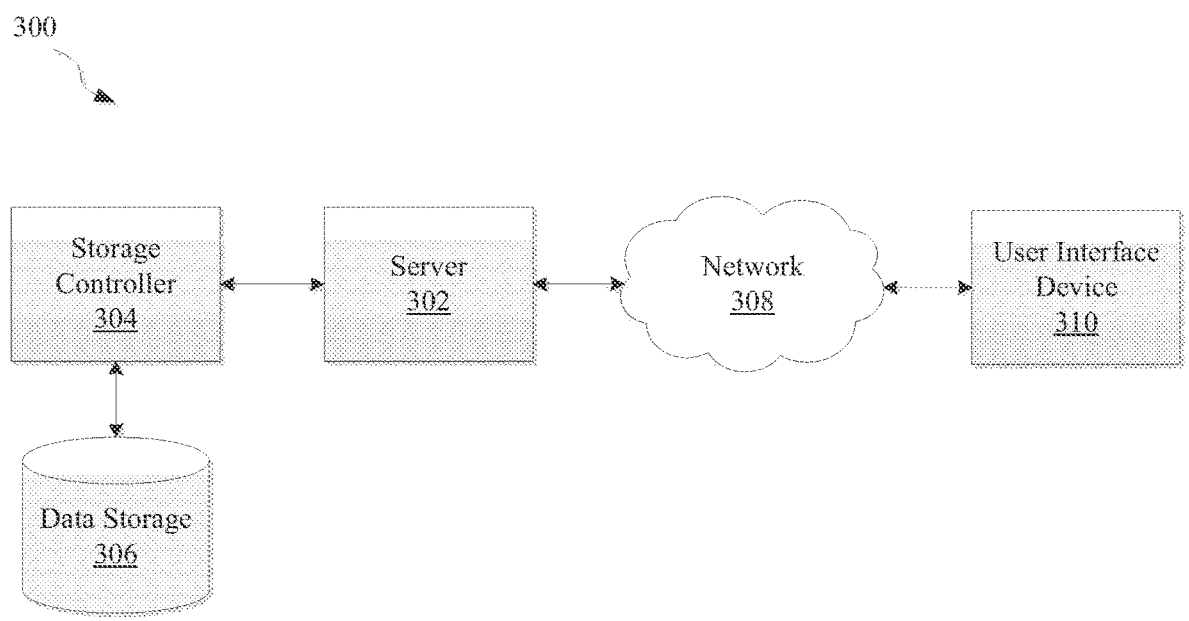
FIG. 3 is a block diagram illustrating a computer network according to one embodiment of the disclosure.

FIG. 3 illustrates a computer system 300 for obtaining access to database files in a computing system according to one embodiment of the disclosure. The computer system 300 may include a server 302, a data storage device 306, a network 308, and a user interface device 310. The server 302 may also be a hypervisor-based system executing one or more guest partitions hosting operating systems with modules having server configuration information. In a further embodiment, the system 300 may include a storage controller 304, or a storage server configured to manage data communications between the data storage device 306 and the server 302 or other components in communication with the network 308. In an alternative embodiment, the storage controller 304 may be coupled to the network 308.

In one embodiment, the user interface device 310 is referred to broadly and is intended to encompass a suitable processor-based device such as a desktop computer, a laptop computer, a personal digital assistant (PDA) or tablet computer, a smartphone or other mobile communication device having access to the network 308. In a further embodiment, the user interface device 310 may access the Internet or other wide area or local area network to access a web application or web service hosted by the server 302 and may provide a user interface for enabling a user to enter or receive information.

The network 308 may facilitate communications of data between the server 302 and the user interface device 310, The network 308 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 310 accesses the server 302 through an intermediate sever (not shown). For example, in a cloud application the user interface device 310 may access an application server. The application server fulfills requests from the user interface device 310 by accessing a database management system (DBMS). In this embodiment, the user interface device 310 may be a computer or phone executing a Java application making requests to a MOSS server executing on a Linux server, which fulfills the requests by accessing a relational database management system (RDMS) on a mainframe server.

Figure 4:
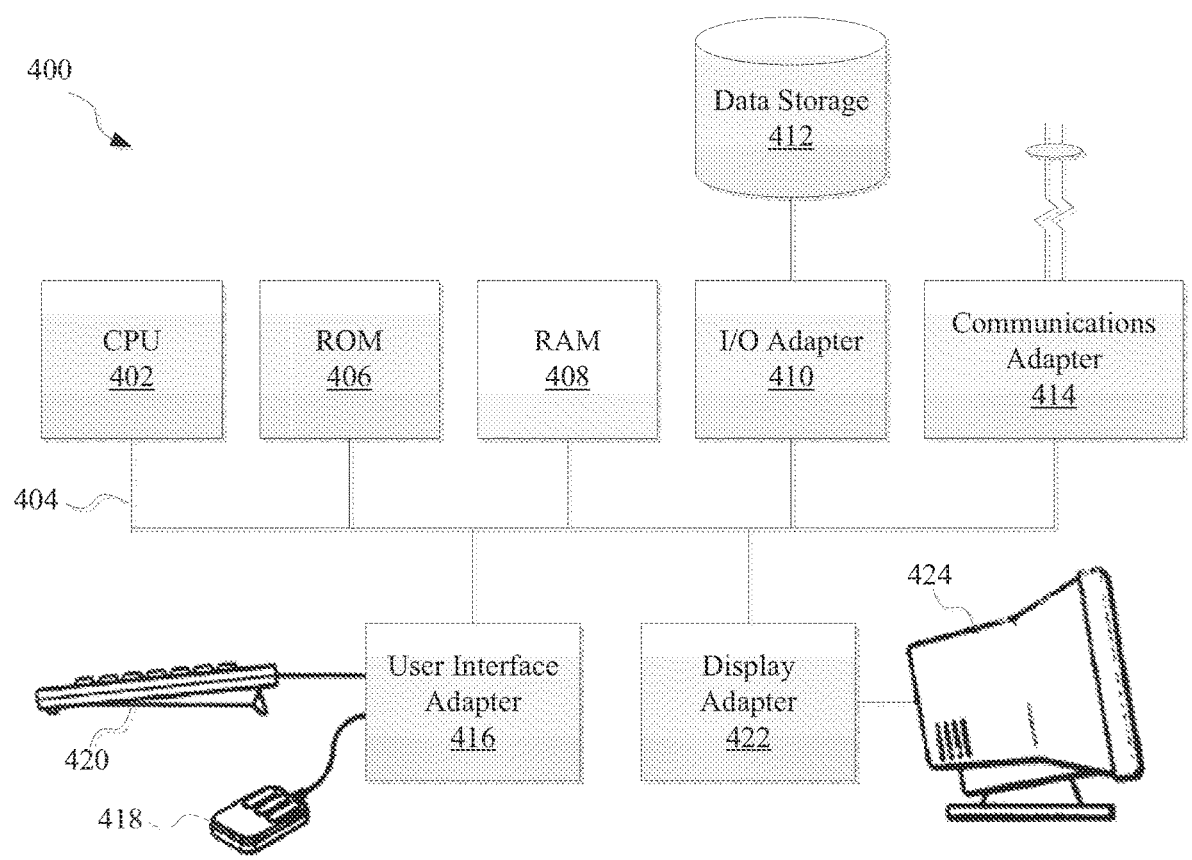
FIG. 4 is a block diagram illustrating a computer system according to one embodiment of the disclosure.

FIG. 4 illustrates a computer system 400 adapted according to certain embodiments of the server 402 and/or the user interface device 410. The central processing unit ("CPU") 402 is coupled to the system bus 404. The CPU 402 may be a general purpose CPU or microprocessor, graphics processing unit ("GPU"), and/or microcontroller. The present embodiments are not restricted by the architecture of the CPU 402 so long as the CPU 402, whether directly or indirectly, supports the operations as described herein. The CPU 402 may execute the various logical instructions according to the present embodiments.

The computer system 400 may also include random access memory (RAM) 408, which may be synchronous RAM (SRAM), dynamic RAM (DRAM), synchronous dynamic RAM (SDRAM), or the like. The computer system 400 may utilize RAM 408 to store the various data structures used by a software application. The computer system 400 may also include read only memory (ROM) 406 which may be PROM, EPROM, EEPROM, optical storage, or the like. The ROM may store configuration information for booting the computer system 400. The RAM 408 and the ROM 306 hold user and system data, and both the RAM 408 and the ROM 406 may be randomly accessed.

The computer system 400 may also include an I/O adapter 410, a communications adapter 414, a user interface adapter 416, and a display adapter 422. The I/O adapter 410 and/or the user interface adapter 416 may, in certain embodiments, enable a user to interact with the computer system 400. In a further embodiment, the display adapter 422 may display a graphical user interface (GUI) associated with a software or web-based application on a display device 424, such as a monitor or touch screen.

The I/O adapter 410 may couple one or more storage devices 412, such as one or more of a hard drive, a solid state storage device, a flash drive, a compact disc (CD) drive, a floppy disk drive, and a tape drive, to the computer system 400, According to one embodiment, the data storage 412 may be a separate server coupled to the computer system 400 through a network connection to the I/O adapter 410. The communications adapter 414 may be adapted to couple the computer system 400 to the network 408, which may be one or more of a LAN, WAN, and/or the Internet. The user interface adapter 416 couples user input devices, such as a keyboard 420, a pointing device 418, and/or a touch screen (not shown) to the computer system 400. The display adapter 422 may be driven by the CPU 402 to control the display on the display device 424. Any of the devices 402-422 may be physical and/or logical.

The applications of the present disclosure are not limited to the architecture of computer system 400. Rather the computer system 400 is provided as an example of one type of computing device that may be adapted to perform the functions of the server 302 and/or the user interface device 310. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 400 may be virtualized for access by multiple users and/or applications.

Figure 5A:
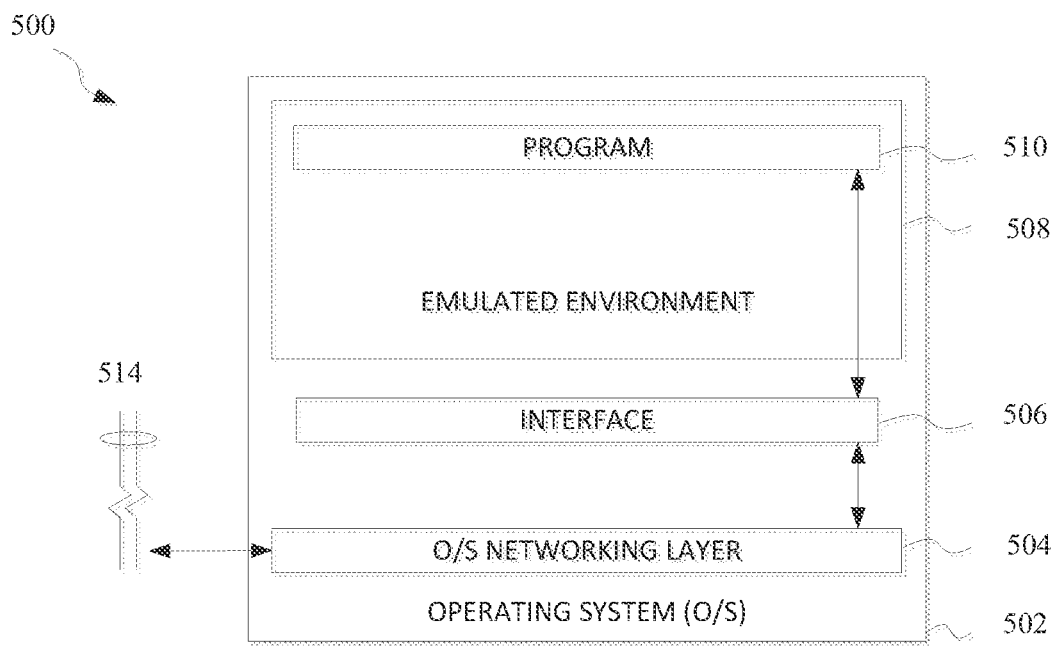
FIG. 5A is a block diagram illustrating a server hosting an emulated software environment for virtualization according to one embodiment of the disclosure.

FIG. 5A is a block diagram illustrating a server 500 hosting an emulated software environment for virtualization according to one embodiment of the disclosure. An operating system 502 executing on a server 500 includes drivers for accessing hardware components, such as a networking layer 504 for accessing the communications adapter 514. The operating system 502 may be, for example, Linux or Windows. An emulated environment 508 in the operating system 502 executes a program 510, such as Communications Platform (CPComm) or Communications Platform for Open Systems (CPCommOS). The program 510 accesses the networking layer 504 of the operating system 502 through a non-emulated interface 506, such as extended network input output processor (XNIOP). The non-emulated interface 506 translates requests from the program 510 executing in the emulated environment 508 for the networking layer 504 of the operating system 502.

Figure 5B:
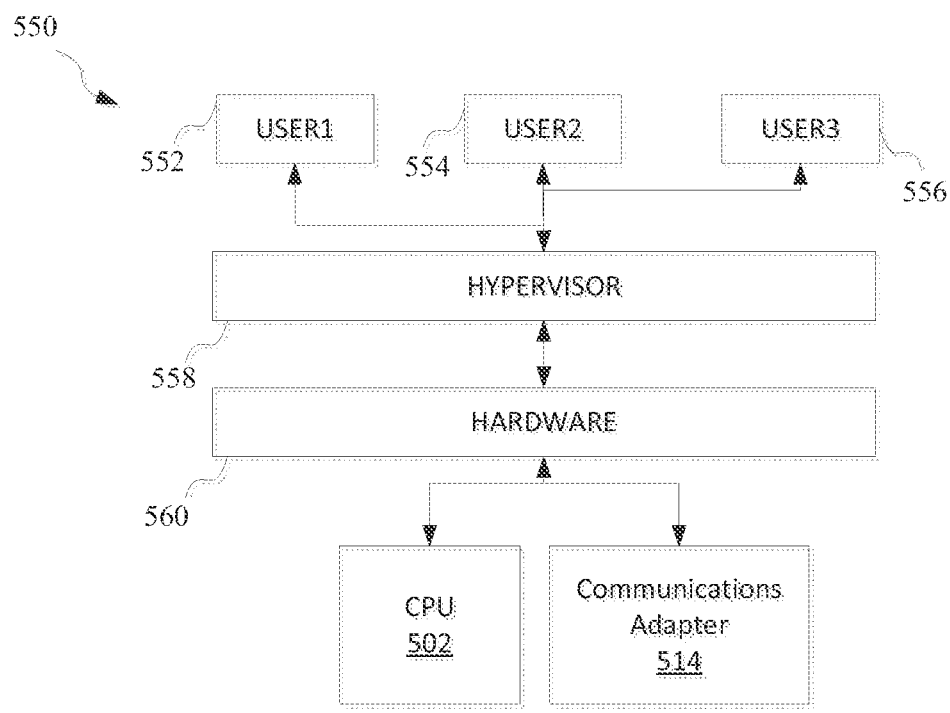
FIG. 5B is a block diagram illustrating a server hosing an emulated hardware environment according to one embodiment of the disclosure.

In another example, hardware in a computer system may be virtualized through a hypervisor. FIG. 5B is a block diagram illustrating a server 550 hosting an emulated hardware environment according to one embodiment of the disclosure. Users 552, 554, 556 may access the hardware 560 through a hypervisor 558. The hypervisor 558 may be integrated with the hardware 560 to provide virtualization of the hardware 560 without an operating system, such as in the configuration illustrated in FIG. 5A. The hypervisor 558 may provide access to the hardware 560, including the CPU 402 and the communications adaptor 514.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising steps of:
   receiving, at a processor, a statement requesting an access for a user to a data file stored in a non-transitory memory medium;
   parsing, by the processor, the statement into one or more arguments, wherein each argument ends with a logical operator except a last argument in the statement;
   computing, by the processor, a skip count for each of the arguments, wherein the skip count for each argument in the statement is based on the logical operator with which it ends and the skip count is zero for an argument in the statement that does not end with a logical operator, and wherein the skip count for each argument in the statement is one of zero or a positive integer;
   evaluating, by the processor, the statement using the skip counts to determine whether the access should be granted to the user, wherein the skip count indicates the number of subsequent arguments in the statement to evaluate;
   if access is granted to the user, retrieving, by the processor, the data file from the non-transitory memory medium and sending the datafile to the user; and if access is not granted, denying the statement requesting access;
wherein a lengthy statement can be evaluated more efficiently by using skip counts to skip portions of the statement during evaluation.

2. The method according to claim 1, wherein the statement includes user identities, at least one logical operator, and at least one parenthesis.

3. The method according to claim 1, wherein the step of parsing, by the processor, the statement into one or more arguments ignores parenthesis.

4. The method according to claim 1, wherein the step of computing, by the processor, a skip count for each of the arguments further includes:
   counting, by the processor, a number of left parenthesis of an argument; and
   counting, by the processor, a number of left parenthesis of a next argument, wherein the next argument is subsequently adjacent to the argument in the statement.

5. The method according to claim 4, wherein the step of computing, by the processor, a skip count for each of the arguments further includes
   setting, by the processor, the skip count equal to a variable Count.

6. The method according to claim 5, wherein the step of computing, by the processor, a skip count for each of the arguments further includes:
   calculating, by the processor, a variable P, wherein P=P+(a number of left parenthesis of an argument)−(a number of right parenthesis of the argument); and
   calculating, by the processor, the variable Count, wherein Count=Count+1,
   wherein the method accumulatively repeats the calculations of P and Count for each argument in the statement.

7. The method according to claim 6, wherein the step of computing, by the processor, a skip count for each of the arguments further includes:
   terminating, by the processor, the calculations of P and Count, if P is not less or not equal to zero;
   terminating, by the processor, the calculations of P and Count, if the argument is a final argument in the statement.

8. A computer program product, comprising:
a non-transitory computer-readable medium comprising instructions which, when executed by a processor of a computing system, cause the processor to perform the steps of:
   receiving a statement requesting an access for a user to a data file stored in a non-transitory memory medium;
   parsing the statement into one or more arguments, wherein each argument ends with a logical operator except a last argument in the statement;
   computing a skip count for each of the arguments, wherein the skip count for each argument in the statement is based on the logical operator with which it ends and the skip count is zero for an argument in the statement that does not end with a logical operator, and wherein the skip count for each argument in the statement is one of zero or a positive integer;
   evaluating the statement using the skip counts to determine whether the access should be granted to the user, wherein the skip count indicates the number of subsequent arguments in the statement to evaluate;
   if access is granted to the user, retrieving, by the processor, the data file from the non-transitory memory medium and sending the datafile to the user; and
   if access is not granted, denying the statement requesting access.

9. The computer program product of claim 8, wherein the statement includes user identities, at least one logical operator, and at least one parenthesis.

10. The computer program product of claim 8, wherein the step of parsing the statement into one or more arguments ignores parenthesis.

11. The computer program product of claim 8, wherein the step of computing a skip count for each of the arguments further includes:
   counting a number of left parenthesis of an argument; and
   counting a number of left parenthesis of a next argument, wherein the next argument is subsequently adjacent to the argument in the statement.

12. The computer program product of claim 11, wherein the step of computing a skip count for each of the arguments farther includes
   setting the skip count equal to a variable Count.

13. The computer program product of claim 12, wherein the step of computing a skip count for each of the arguments further includes:
   calculating a variable P, wherein P=P+(a number of left parenthesis of an argument)−(a number of right parenthesis of the argument); and
   calculating the variable Count, wherein Count=Count+1, wherein the method accumulatively repeats the calculations of P and Count for each argument in the statement.

14. The computer program product of claim 13, wherein the step of computing a skip count for each of the arguments further includes:
   terminating the calculations of P and Count, if P is not less or not equal to zero;
   terminating the calculations of P and Count, if the argument is a final argument in the statement.

15. An apparatus, comprising:
a memory; and
a processor coupled to the memory, the processor being configured to execute the steps of:
   receiving a statement requesting an access for a user to a data file stored in a non-transitory memory medium;
   parsing the statement into one or more arguments, wherein each argument ends with a logical operator except a last argument in the statement;
   computing a skip count for each of the arguments, wherein the skip count for each argument in the statement is based on the logical operator with which it ends and the skip count is zero for an argument in the statement that does not end with a logical operator, and wherein the skip count for each argument in the statement is one of zero or a positive integer;
   evaluating the statement using the skip counts to determine whether the access should be granted to the user, wherein the skip count indicates the number of subsequent arguments in the statement to evaluate;
   if access is granted to the user, retrieving, by the processor, the data file from the non-transitory memory medium and sending the datafile to the user; and
   if access is not granted, denying the statement requesting access.

16. The apparatus of claim 15, wherein the statement includes user identities, at least one logical operator, and at least one parenthesis.

17. The apparatus of claim 15, wherein the step of parsing the statement into one or more arguments ignores parenthesis.

18. The apparatus of claim 15, wherein the step of computing a skip count for each of the arguments further includes:
   counting a number of left parenthesis of an argument; and
   counting a number of left parenthesis of a next argument, wherein the next argument is subsequently adjacent to the argument in the statement.

19. The apparatus of claim 18, wherein the step of computing a skip count for each of the arguments further includes
   setting the skip count equal to a variable Count.

20. The apparatus of claim 19, wherein the step of computing a skip count for each of the arguments further includes:
   calculating a variable P, wherein P=P+(a number of left parenthesis of an argument)−(a number of right parenthesis of the argument); and
   calculating the variable Count, wherein Count=Count+1, wherein the method accumulatively repeats the calculations of P and Count for each argument in the statement.

* * * * *

UNITED STATES PATENT AND TRADEMARK OFFICE
CERTIFICATE OF CORRECTION

| | | |
|---|---|---|
| PATENT NO. | : 11,977,650 B2 | Page 1 of 1 |
| APPLICATION NO. | : 17/811680 | |
| DATED | : May 7, 2024 | |
| INVENTOR(S) | : Adam Gallagher | |

It is certified that error appears in the above-identified patent and that said Letters Patent is hereby corrected as shown below:

On the Title Page

Item (57), ABSTRACT, Line 4:
The line reading "instructions, The instructions include receiving a statement" should read
-- instructions. The instructions include receiving a statement --

Item (56), OTHER PUBLICATIONS, page 2, Line 11:
The line reading "Due", U.S. Appl. No. 15/187,950, dated Apr. 5, 2022, 110 pgs." should read
-- Due", U.S. Appl. No. 15/187,950, dated Apr. 5, 2022, 10 pgs. --

In the Claims

In Column 12, Line No. 23:
The line reading "farther includes" should read -- further includes --

Signed and Sealed this
Second Day of September, 2025

Coke Morgan Stewart
*Acting Director of the United States Patent and Trademark Office*